R. B. PATTERSON, Sr.
ASH PAN.
APPLICATION FILED JUNE 1, 1909.

940,403.

Patented Nov. 16, 1909.

Witnesses:

Inventor:
Richard B. Patterson, Sr.
his Attorney.

UNITED STATES PATENT OFFICE.

RICHARD B. PATTERSON, SR., OF EAST CHICAGO, INDIANA, ASSIGNOR OF ONE-HALF TO JOHN M. WEBER, OF CHICAGO, ILLINOIS.

ASH-PAN.

940,403.     Specification of Letters Patent.     Patented Nov. 16, 1909.

Application filed June 1, 1909. Serial No. 499,379.

*To all whom it may concern:*

Be it known that I, RICHARD B. PATTERSON, Sr., a citizen of the United States, residing at East Chicago, county of Lake, and State of Indiana, have invented certain new and useful Improvements in Ash-Pans, of which the following is a specification.

My invention relates to ash pans.

The object of my invention is to provide a pan of such character designed for use in stoves, furnaces, or the like, where the ash pit or the ash pan containing compartment is of greater dimensions than the pan permitted to be received therein.

A further object is the provision of the pan as stated provided with means which, when the pan is arranged in a pit of greater dimensions, may be positioned to traverse the space intervening the outer surface of the pan and the inside surface of the pit, such means being adapted when in such position to guide any ashes dropping thereon from the grate, into the pan, and hence to prevent the accumulation of ashes in the pit in such intervening space, a usual occurrence in stoves or furnaces of ordinary construction.

A further object is to provide an ash pan as mentioned which will be efficient in use, and of strong, durable, and economical construction. Other objects will appear hereinafter.

With these objects in view my invention consists in an ash pan characterized as above mentioned and in certain details of construction and arrangement of parts all as will be hereinafter fully described and particularly pointed out in the claims.

Figure 1:
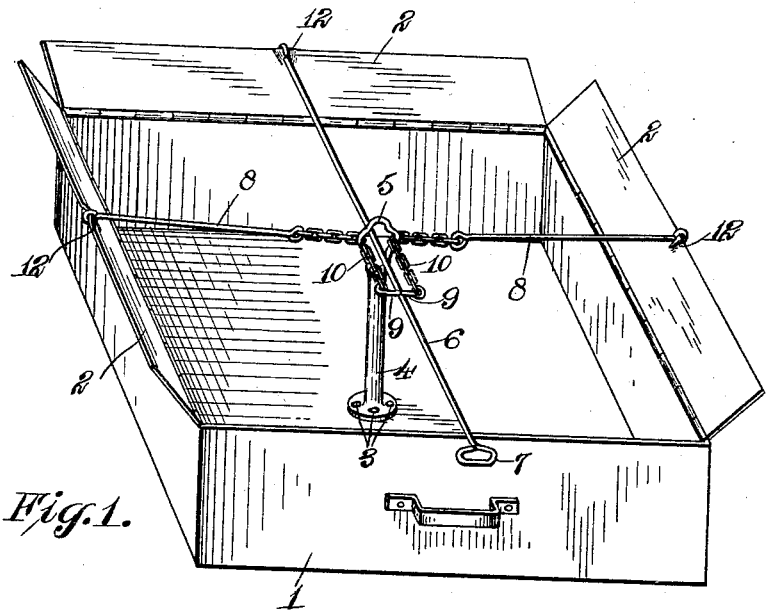
Figure 2:
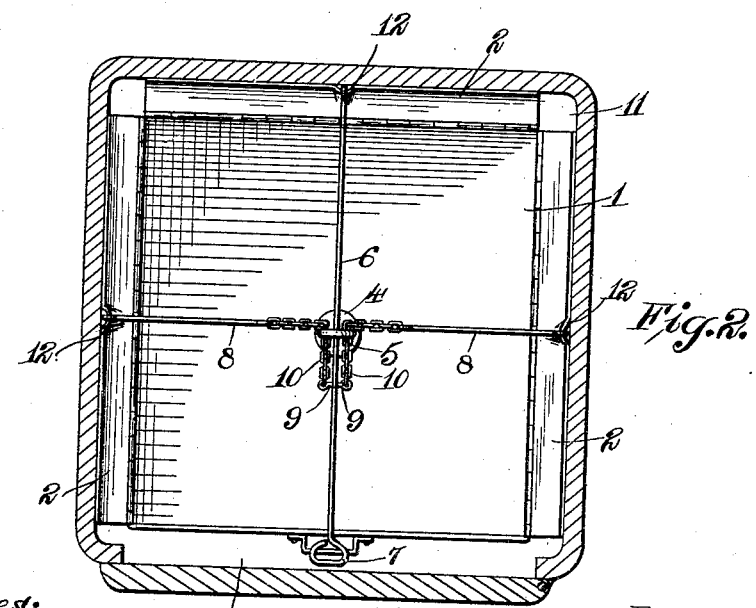

My invention will be more readily understood by reference to the accompanying drawings forming a part of this specification, and in which, Figure 1 is a perspective view of my pan in its preferred form, and Fig. 2 is a horizontal section through the ash pit of a stove or furnace showing the arrangement of my pan therein.

Referring now to the drawings, 1 indicates the ash pan, the design or shape of which will be governed by the inner contour of the ash pit in which the same is to be used; therefore, although in the drawings I have shown a pan of rectangular form, it is understood I do not wish to limit myself thereto, but consider myself at liberty to employ one of any other form to which the following construction is applicable. Hingedly secured in any suitable manner to the upper edges of the lateral and rear sides of said pan are wings or flanges 2 coextensive with such edges and of suitable width. Arranged, preferably centrally, in the bottom of said pan, the same being secured thereto preferably by rivets 3 passing through the flanged base thereof, is a vertically extending standard 4 the upper end portion of which is formed into a loop 5. Having its rearward extremity secured to, preferably the upper edge of the rearward wing 2, the same extending forwardly therefrom through the loop 5 to the forward edge of the pan, is a rod 6 at the forward extremity of which is formed a hand loop 7. Having their outer extremities secured, preferably to the upper edge, of the lateral wings 2, are inwardly projecting rods 8. Having their outer extremities secured to the inner extremities of the rods 8, the same passing through the loop 5 and extending forwardly therefrom and being secured at their forward extremities to arms 9 laterally projecting from the rod 6, are chains 10 or other suitable flexible connecting means.

With such construction, it is evident that by simply actuating the rod 6, the angular disposition of the wings 2 may be readily adjusted. In use, the pan being arranged in the ash pit 11, the wings 2 are dropped so that the upper edges thereof engage the inner surface of said pit, as clearly shown. In order to effect the close engagement of said wings with said pit inner walls, the upper edges of the former at the points of connection therewith of the rods 6 and 8 are buckled as at 12, such buckles evidently accommodating the projecting attached extremities of said rods. In such position, it is evident that practically all ashes dropping from the grate above will be directed and deposited into the pan. Upon desiring to remove the pan from the pit, the wings, by means of the rod 6, may be elevated to vertical position, in which position the removal of the pan through the opening 13, which as shown, is of a width to just permit of the passage of the latter therethrough may be effected. While I have shown what I deem to be the preferable form of my device I do not wish to be limited thereto as there might be many changes made in the details of construction, such for example, as in the detail construction of the standard 4, or the flexible connection between the rod 6 and 8, and the arrangement of parts without departing from the spirit of the invention comprehended within the scope of the appended claims.

Having described my invention what I claim as new and desire to secure by Letters Patent is:

1. In an ash pan, wings hinged to the upper edges of the lateral and rear sides thereof, a standard provided in said pan, and means coöperating with said standard for adjusting the angular disposition of said wings.

2. In an ash pan, wings hinged to the upper edges of the lateral and rear sides thereof, a standard provided in said pan, and means coöperating with said standard engaging the upper edges of said wings, for adjusting the angular disposition of said wings.

3. In an ash pan, wings coextensive with and hinged to the upper edges of the lateral and rear sides thereof, rods connected to and inwardly projecting from said wings, operative connections between said rods, and a guiding standard coöperating with said operative connections for effecting the angular adjustment of said wings, substantially as described.

4. In an ash pan, wings coextensive and in hinged connection with the upper edges of the lateral and rear sides thereof, a standard provided in said pan, a rod connected to the rearward wing and projecting to the front extremity of said pan, shorter arms connected to and inwardly projecting from said lateral wings, means effecting a flexible connection between said shorter rods and said first named rod, said standard serving as a means of changing the direction of movement of said flexible means upon the actuation of said first named rod, substantially as described.

5. In an ash pan, wings coextensive and in hinged connection with the upper edges of the lateral and rear sides thereof, a rod connected to the rear wing and projecting to the front extremity of said pan, an operative connection between said rod and said lateral wings, substantially as described.

6. In an ash pan, wings coextensive and in hinged connection with the upper edges of the lateral and rear sides thereof, a standard provided in said pan having a looped upper end portion, a rod connected to the rear wing extending through said loop to the front edge of said pan, inwardly extending shorter rods connected to said lateral wings, and flexible means passing through said loop connecting said first named rod and the inner extremities of said shorter rods, substantially as described.

In testimony whereof I have signed my name to this specification in the presence of two subscribing witnesses.

RICHARD B. PATTERSON, Sr.

Witnesses:
JOSHUA R. H. POTTS,
HELEN F. LILLIS.